(12) United States Patent
Kim

(10) Patent No.: US 9,476,972 B2
(45) Date of Patent: Oct. 25, 2016

(54) APPARATUS FOR PROCESSING RADAR SIGNAL AND METHOD FOR PROCESSING RADAR SIGNAL

(71) Applicant: Electronics and Telecommunications Research Institute, Daejeon (KR)

(72) Inventor: Dong Kyoo Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 198 days.

(21) Appl. No.: 14/320,401

(22) Filed: Jun. 30, 2014

(65) Prior Publication Data

US 2015/0198702 A1 Jul. 16, 2015

(30) Foreign Application Priority Data

Nov. 1, 2013 (KR) .................. 10-2013-0132496
Feb. 14, 2014 (KR) .................. 10-2014-0017493

(51) Int. Cl.
| | | |
|---|---|---|
| *G01S 13/02* | (2006.01) | |
| *G01S 13/10* | (2006.01) | |
| *G01S 13/28* | (2006.01) | |
| *G01S 13/88* | (2006.01) | |
| *H04L 25/02* | (2006.01) | |

(52) U.S. Cl.
CPC .......... *G01S 13/0209* (2013.01); *G01S 13/106* (2013.01); *G01S 13/282* (2013.01); *G01S 13/288* (2013.01); *G01S 13/885* (2013.01); *G01S 13/887* (2013.01); *H04L 25/0202* (2013.01)

(58) Field of Classification Search
CPC ............ G01S 13/0209; G01S 13/106; G01S 13/282; G01S 13/288; G01S 13/885; G01S 13/887; H04L 25/0202
USPC ............................................. 342/21
See application file for complete search history.

(56) References Cited

U.S. PATENT DOCUMENTS

2011/0279305 A1 11/2011 Lellouch et al.
2011/0279307 A1* 11/2011 Song ................ G01S 13/282
342/132

* cited by examiner

*Primary Examiner* — Timothy A Brainard

(57) ABSTRACT

Disclosed is an apparatus for processing a radar signal, including: a transmitting unit which irradiates a plurality of baseband signals as a plurality of division band penetration signals to a target object based on a channel frequency; a receiving unit which receives a plurality of reflection signals reflected from the target object to integrate the received reflection signals as an integration band response signal; and a control unit which sets the channel frequency so that at least some bands of adjacent division band penetration signals among the plurality of division band penetration signals are overlapped with each other.

20 Claims, 11 Drawing Sheets

2507

APPARATUS FOR PROCESSING RADAR SIGNAL AND METHOD FOR PROCESSING RADAR SIGNAL

CROSS-REFERENCE TO RELATED APPLICATIONS

This application claims priority to and the benefit of Korean Patent Applications No. 10-2013-0132496 and 10-2014-0017493 filed in the Korean Intellectual Property Office on Nov. 1, 2013 and Feb. 17, 2014, the entire contents of which are incorporated herein by reference.

TECHNICAL FIELD

The present invention relates to an apparatus for processing a radar signal and a method for processing a radar signal, and more particularly, to an apparatus for processing a radar signal and a method for processing a radar signal that transmit a radar signal to a division band and integrate reflected division band radar signals to a full band.

BACKGROUND ART

A penetrating radar apparatus is one of apparatuses used for non-destructive inspection. The penetrating radar apparatus projects an RF penetration signal to a transmissive object and thereafter, receives a reflected signal to analysis an inner structure of the object.

A method in which the penetrating radar apparatus acquires the reflected signal includes an impulse scheme and a step frequency scheme.

The impulse scheme is a scheme that uses a signal having higher energy within a very short time, that is, an impulse signal as a projection signal. The projected impulse signal has a wideband frequency characteristic. Herein, as a bandwidth of a frequency is wider, the inner structure of the object can be detected with high resolution. Further, since the impulse scheme projects a wideband signal at once, the impulse scheme can generally perform sensing very rapidly.

The step frequency scheme is a scheme that senses the inner surface of the object by taking an effect such as projecting a continuous wave (CW) signal (that is, a sine wave) at a predetermined frequency interval within a specific frequency band to project the wideband signal on the whole. In the step frequency scheme, a frequency of a CW signal is divided into steps with the passage of time and raised or dropped to generate the wideband signal unlike the impulse scheme that projects the wideband signal at once, a time is required to generate one wideband signal, and as a result, sensing is performed at a much lower speed compared to the impulse scheme.

Meanwhile, the step frequency scheme has a merit in that it is advantageous in acquiring the high-resolution transmissive signal because a frequency band characteristic of the generated signal is good and the signal is generated with high power. But as described above, the step frequency scheme has a limit in being utilized efficiently due to a characteristic that only very low-speed sensing is enabled.

SUMMARY OF THE INVENTION

The present invention has been made in an effort to provide an apparatus for processing a radar signal and a method for processing a radar signal that can solve channel discontinuity, DC element per each channel, and phase adjustment between adjacent channels which occur when a division band radar scheme is performed.

The present invention has been made in an effort to provide an apparatus for processing a radar signal and a method for processing a radar signal that can irradiate a radar signal in a plurality of division bands based on OFDM to a target object and rapidly acquire a wideband response signal by using a reflected signal.

Technical objects of the present invention are not limited to the aforementioned technical objects and other technical objects which are not mentioned will be apparently appreciated by those skilled in the art from the following description.

An embodiment of the present invention provides an apparatus for processing a radar signal, including: a transmitting unit which irradiates a plurality of baseband signals as a plurality of division band penetration signals to a target object based on a channel frequency; a receiving unit which receives a plurality of reflection signals reflected from the target object to integrate the received reflection signals as an integration band response signal; and a control unit which sets the channel frequency so that at least some bands of adjacent division band penetration signals among the plurality of division band penetration signals are overlapped with each other.

Another embodiment of the present invention provides a method for processing a radar signal, including: setting the channel frequency so that at least some bands of adjacent division band penetration signals among the plurality of division band penetration signals are overlapped with each other; converting a plurality of baseband signals into the plurality of division band penetration signals based on the channel frequency to irradiate the division band penetration signals to a target object; and receiving a plurality of reflection signals reflected from the target object to integrate the received reflection signals as an integration band response signal.

According to embodiments of the present invention, an apparatus for processing a radar signal and a method for processing a radar signal divide an integration band into a plurality of bands and transmit/receive the radar signal in a multi-channel OFDM scheme so that some bands overlap with each other, thereby rapidly acquiring a high-quality impulse response signal.

According to the embodiments of the present invention, the apparatus for processing a radar signal and the method for processing a radar signal selectively remove a component of a phase discontinuing and overlapping band of a channel boundary to improve accuracy of an impulse response in constituting a plurality of division band signals by one integration band.

The embodiment of the present invention is illustrative only, and various modifications, changes, substitutions, and additions may be made without departing from the technical spirit and range of the appended claims by those skilled in the art, and it will be appreciated that the modifications and changes are included in the appended claims.

Figure 1:
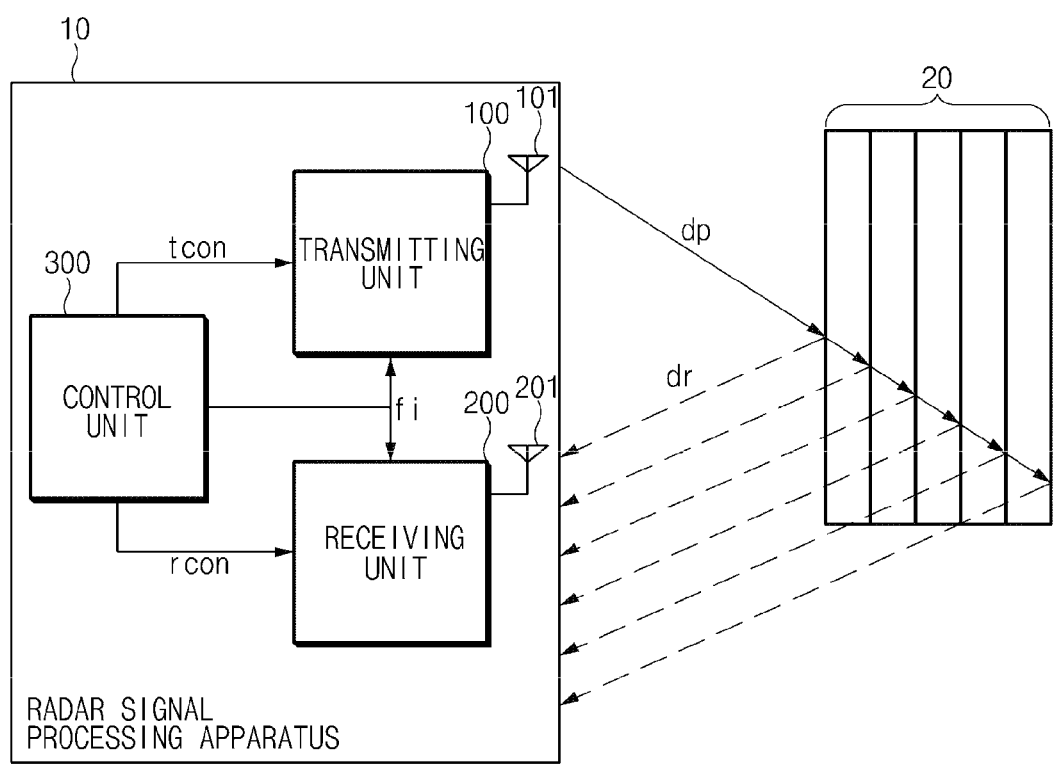
FIG. 1 is a diagram illustrating an apparatus for processing a radar signal and a target object to which the radar signal is irradiated according to an embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, embodiments of the present invention will be described in detail with reference to the accompanying drawings. Like reference numerals refer to like constituent elements and a duplicated description of like constituent elements will be omitted.

Specific structural or functional descriptions of embodiments of the present invention disclosed in the specification are made only for the purposes of describing the embodiments of the present invention, and the embodiments of the present invention may be carried out in various forms, and it should not be construed that the present invention is limited to the embodiments described in the specification.

In describing constituent elements of the embodiment of the present invention, terms such as first, second, A, B, (a), and (b) may be used. The terms are only used to distinguish a constituent element from another constituent element, but nature or an order of the constituent element is not limited by the terms.

The present invention relates to an apparatus for processing a radar signal and a method for processing a radar signal for acquiring a high-quality channel impulse response by using a signal of a division band radar for rapidly acquiring a signal of a high-resolution wideband penetrating radar.

A new field which is emerging among application fields of a penetrating radar technology includes a field that senses a status of a road traffic facility. Globally, as the number of worn out road traffic facility is increased, a demand for a technology regarding maintenance/repairing is increased and construction of a new facility is further increased and a demand for a technology associated with measurement of manufacturing quality of the new facility is explosively increased also. A representative sensing field includes diagnosing an internal crack status of a road/bridge and measuring the thickness of a pavement of a new laying road.

In general, an internal sensing depth of the road traffic facility is approximately 1 to 2 meters and a sensing resolution needs to be within 3 centimeters. Accordingly, a step frequency scheme in the penetrating radar technology is suitable therefor. However, when a work is performed by using a product of the step frequency scheme, the traffic on the road needs to be restricted, thus inconvenience is caused and a work hour is very long. Thereby, a continuous road monitoring task cannot be performed at present.

A method is proposed, which can acquire a radar signal by using a division band by using a multicarrier, that is, an OFDM technology in order to solve a problem in which a scan speed is low, which occurs because the step frequency scheme uses a CW signal. In the present invention, such a scheme is called a 'division band radar scheme.

The present invention relates to a method for determining a channel frequency by a transmitting/receiving unit for channel division, a channel junction method in a receiving unit, a method for processing discontinuous phases on a channel boundary, and a method for processing a signal in each division band direct current (DC) area in a division band radar scheme.

FIG. 1 is illustrates an apparatus for processing a radar signal and a target object to which the radar signal is irradiated according to an embodiment of the present invention.

Referring to FIG. 1, an apparatus 10 for processing a radar signal according to the embodiment of the present invention may include a transmitting unit 100, a receiving unit 200, and a control unit 300.

The transmitting unit 100 receives a transmission control signal tcon and a channel frequency fi from the control unit 300. The transmitting unit 100 generates an OFDM based division band penetration signal dp based on the transmission control signal tcon and the channel frequency fi. The division band penetration signal dp is irradiated to a target object 20 through a transmitting antenna 101. For example, the target object 20 may be a road traffic facility.

The division band penetration signal dp irradiated by the transmitting unit 100 may form a plurality of penetration signals in a baseband, and be converted and transmitted to a pass band determined according to a division band channel bandwidth while setting the channel frequency fi set by a plurality of channels (for example, M (M is a natural number greater than or the same as two) channels) as a carrier.

In particular, in the apparatus 10 for processing a radar signal according to the embodiment of the present invention, at least some bands of penetration signals, which are adjacent to each other, that is, are sequentially transmitted, are overlapped with each other in setting the channel frequency fi of the division band penetration signal dp. When an overlapping frequency area where the adjacent division band penetration signals dp is wider, the number of the division band penetration signals dp which need to be transmitted and received is increased in order to generate the same integration band response signal, but an improved impulse response signal may be acquired.

The target object 20 receives and reflects the division band penetration signal dp from the transmitting unit 100 to provide a plurality of reflection signals dr to the receiving unit 200. The target object 200 may be constituted by multiple layers and the reflection signal dr depending on the division band penetration signal dp may be provided to the receiving unit 200 with various angles and time variances.

The receiving unit 200 may receive the OFDM based reflection signal dr reflected from the target object 20 through the receiving antenna 201 to generate the wideband response signal.

The control unit 300 sets the channel frequency fi so that the division band penetration signals of adjacent channels among the plurality of division band penetration signals dp are overlapped with each other in some bands, and provides the division band penetration signals to the transmitting unit 100 and the receiving unit 200. A method for setting the channel frequency fi by the control unit 300 will be described later.

The control unit 300 may control an operation by providing the transmission control signal tcon and a reception control signal rcon to the transmitting unit 100 and the receiving unit 200, respectively.

Figure 2A:
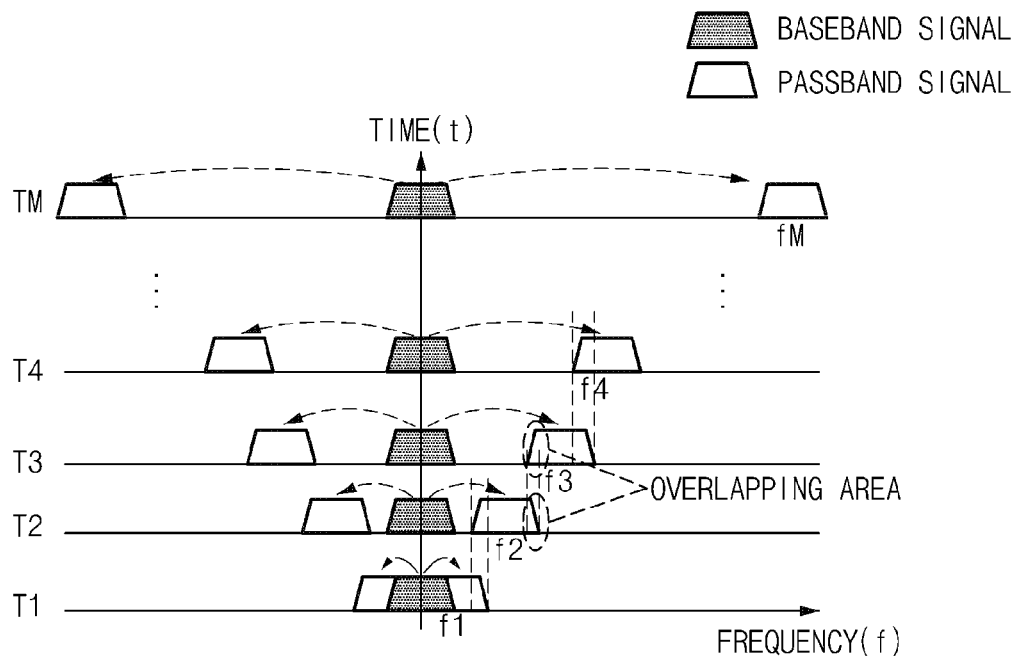
FIGS. 2A to 2C are diagrams for describing transmission of a division band penetration signal, reception of a reflection signal, and construction of an integration band response signal in the apparatus for processing a radar signal according to an embodiment of the present invention.
Figure 2B:
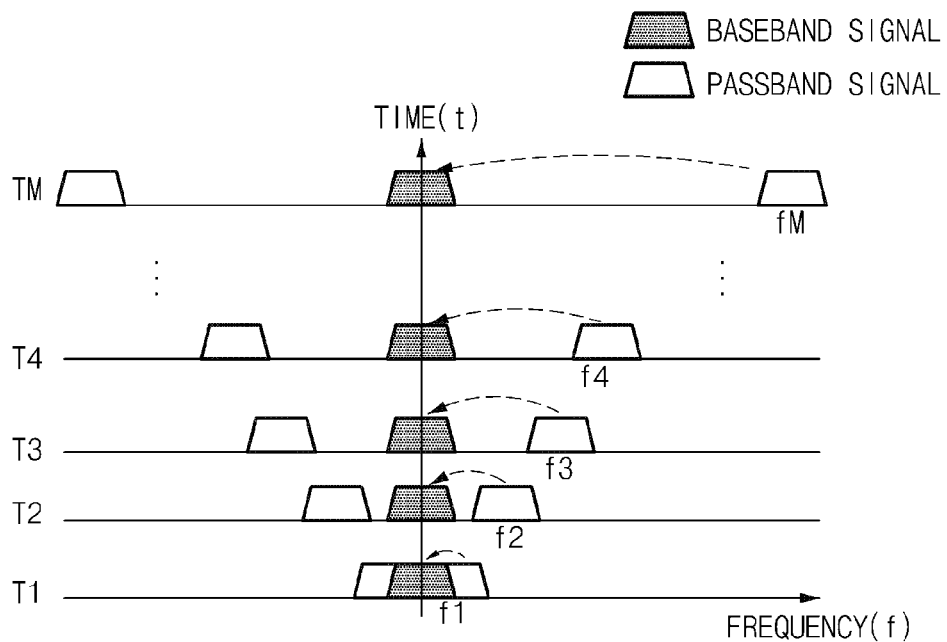
Figure 2C:
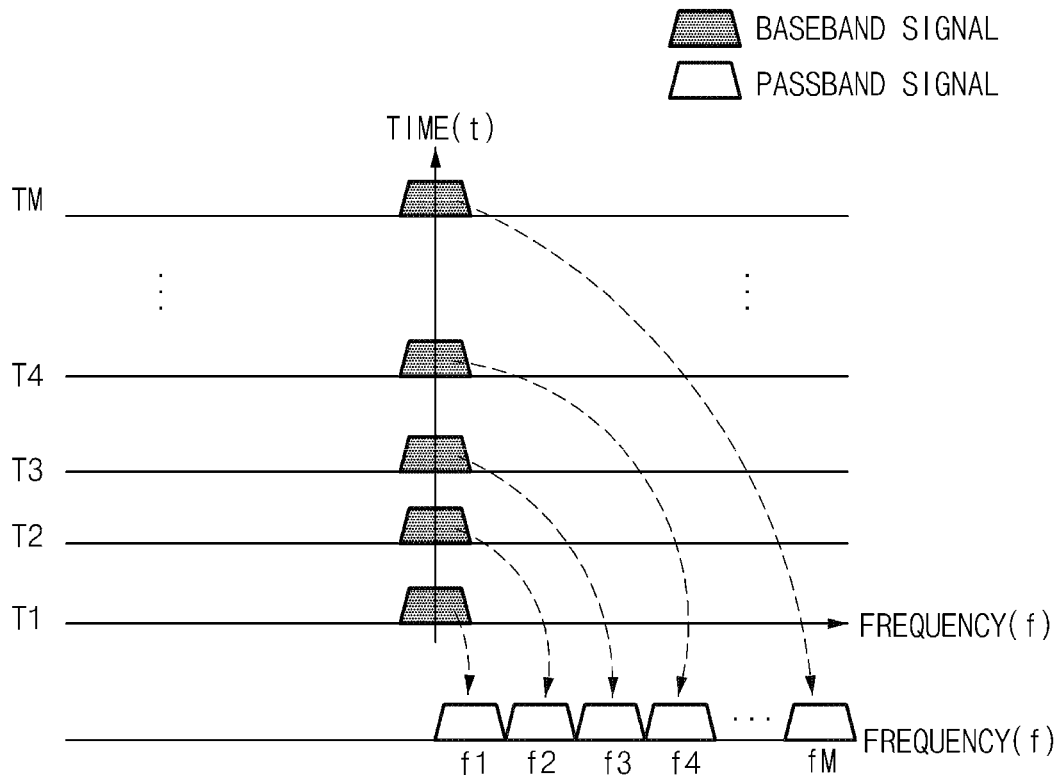

FIGS. 2A to 2C are diagrams for describing transmission of a division-band penetration signal, reception of a reflected signal, and construction of an integration band response signal in the apparatus for processing a radar signal according an embodiment of the present invention.

FIG. 2A is a diagram for describing a transmission process of a division band penetration signal of a transmitting unit in the apparatus for processing a radar signal according to an embodiment of the present invention.

Referring to FIG. 2A, a baseband signal is generated and increased to respective channel frequencies f1, f2, f3, f4, . . . , fM through M channels to be transmitted to channel signals in a pass band, that is, the division-band penetration signals dp.

For example, from a time T1 to a time T2, a first baseband signal is increased to a channel using a first channel frequency f1 as the carrier in a baseband to be transmitted to a first division band penetration signal. Division band penetration signals transmitted in respective time domains have different pass bands, but some pass bands are overlapped with each other.

In FIG. 2A, an area where division band penetration signals of a plurality of channels are overlapped with each other is marked by a dotted line. As illustrated in FIG. 2A, setting the channel frequency that allows bands of signals of adjacent channels to overlap with each other will be described below with reference to FIGS. 6A and 6B.

FIG. 2B is a diagram for describing a reception process of a received signal by a receiving unit in the apparatus for processing a radar signal according to an embodiment of the present invention.

The receiving unit 200 receives the channel signal in the pass band, which has a carrier of the first channel frequency f1, from the time T1 to the time T2 to drop the received channel signal to the baseband channel signal.

Similarly, by repeating processes of receiving the channel signal in the pass band, which has a carrier of a second channel frequency f2, to drop the received channel signal to the baseband channel signal from the time T2 to a time T3, the receiving unit 200 receives a channel signal in a pass band, which has a carrier of the M-th channel frequency fM, to drop the received channel signal to the baseband channel signal from the last time TM−1 to a time TM.

When all signals in M channels are dropped to the baseband, the receiving unit 200 constitutes baseband channel signals into the integration band response signal.

FIG. 2C is a diagram for describing a process of constituting the channel signals dropped to the baseband into the integration band response signal.

Referring to FIG. 2C, the channel signals dropped to the baseband are constituted by the integration band response signal. The operation of FIG. 2C may be performed by a constructor described below in FIG. 8.

When the radar signal is transmitted and received through the plurality of division bands, an improved response may be acquired similarly as transmitting and receiving an impulse radar signal just by removing the channel boundary and by adjusting a phase discontinuity on a channel boundary while the constructor constitutes the plurality of channel signals by the integration band, and a DC area component generated when the channel signals are dropped to the baseband.

Figure 3:
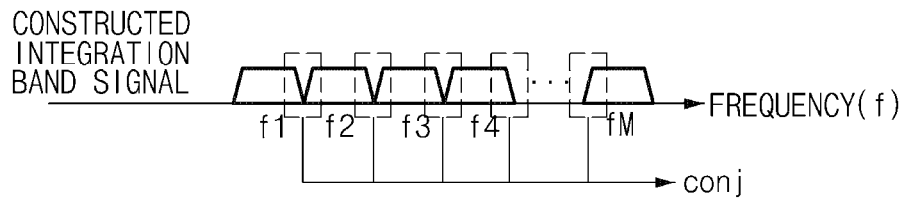
FIG. 3 is a diagram for describing a channel junction area of an integration band response signal.

FIG. 3 is a diagram for describing a channel junction area of an integration band response signal.

Referring to FIG. 3, when the integration band response signal constituted in the receiving unit 200 is configured, a channel junction area conj between respective channels is generated. When an integration band response signal bandwidth is given, in the case where an interval between the division band channels is the same as the division band signal bandwidth, the integration band signals may be constituted by the smallest number of division band signals.

However, when the interval between the division band channels is the same as the division band signal bandwidth, resolution of a channel impulse response signal is significantly decreased. The resolution of the channel impulse response signal is a factor for determining detection resolution of a radar. Therefore, as described above, in the present invention, the improved channel impulse response signal may be acquired by setting the channel frequency so that the intervals among the division band channels are overlapped with each other.

In this case, reflection signals of respective channels may be overlapped with each other in the channel junction area conj and processing in order to solve the overlapping therebetween is required. Accordingly, a process of selectively removing components of some reflection signals by setting the channel boundary is required.

Figure 4:
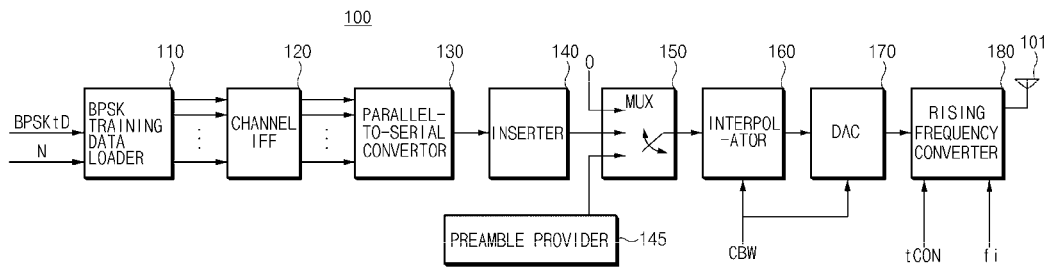
FIG. 4 is a block diagram illustrating an embodiment of a transmitting unit of FIG. 1.

FIG. 4 is a block diagram illustrating an embodiment of a transmitting unit of FIG. 1.

Referring to FIG. 4, the transmitting unit 100 may include a BPSK training data loader 110, a channel IFFT 120, a parallel to serial convertor 130, an inserter 140, a preamble provider 145, a multiplexer 150, an interpolator 160, a digital-to-analog converter 170, and a rising frequency converter 180.

The BPSK training data loader 110 may receive BPSK training data BPSKtD and the number N of subcarriers per channel to arrange the BPSK training data BPSKtD in parallel as many as the number N of subcarriers per channel.

The channel IFFT 120 performs inverse fast Fourier transform (IFFT) as many as the number N of subcarriers per channel. For example, it may be appreciated that the channel IFFT 120 performs an operation of converting data of a frequency domain into data of a time domain.

The parallel-to-serial convertor 130 converts N inversely Fourier-transformed results in series.

The inserter 140 inserts a cyclic prefix code into the result converted in series.

The preamble provider 145 generates a preamble and provides the generated preamble to the multiplexer 150. Thereafter, when the division band channel signal is irradiated and then received, the preamble allows the reflected signal to be easily detected.

The multiplexer 150 selects and outputs one of an output, a real number (for example, '0') and a preamble of the inserter 140.

The interpolator 160 may interpolate the output of the multiplexer 150 and perform interpolation based on a channel bandwidth CBW.

The digital-to-analog converter 160 converts an interpolated signal into an analog signal.

The rising frequency converter 180 increases the baseband signal to the channel frequency based on the transmission control signal tcon and the channel frequency fi provided from the control unit 300 of FIG. 1, to transmit the division band penetration signal dp through the transmitting antenna 101.

The rising frequency converter 180 may mix an in-phase component and a quadrature component of the baseband based on the channel frequency fi received from the control unit 300 and output the mixed components to the pass band.

Figure 5:
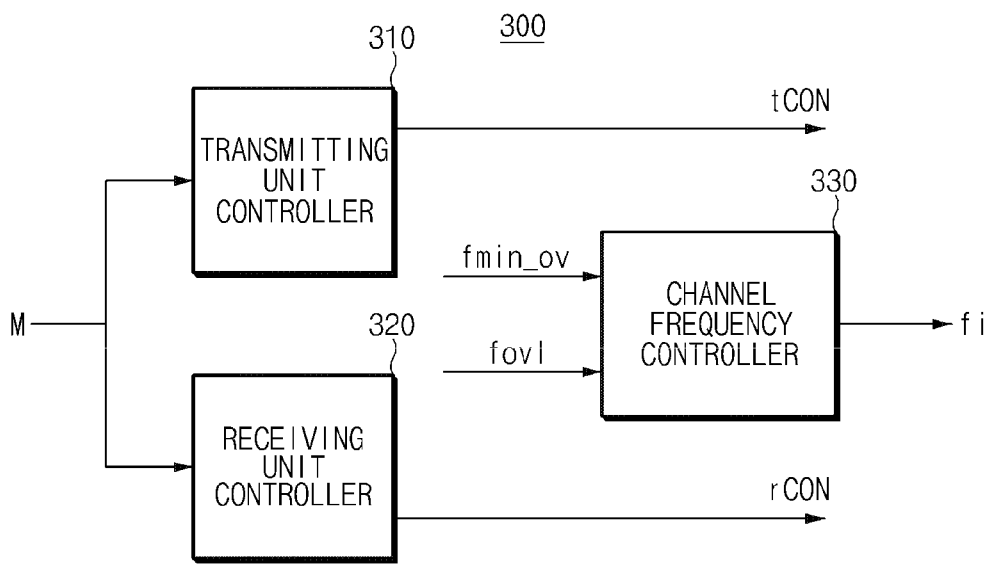
FIG. 5 is a block diagram illustrating an embodiment of a control unit of FIG. 1.

FIG. 5 is a block diagram illustrating an embodiment of a control unit of FIG. 1.

Referring to FIG. 5, the control unit 300 may include a transmitting unit controller 310, a receiving unit controller 320, and a channel frequency controller 330.

The transmitting unit controller 310 may generate the transmission control signal tcon, which controls an operation of the transmitting unit 100 by receiving a channel number M, to provide the generated transmission control signal tcon to the transmitting unit 100.

The receiving unit controller 320 may generate the reception control signal rcon, which controls an operation of the receiving unit 200 by receiving the channel number M, to provide the generated reception control signal rcon to the receiving unit 200.

The channel frequency controller 330 receives a minimum overlapping frequency fmin_ov and an overlapping frequency fovl to generate the channel frequency fi. As described above, the channel frequency fi generated by the channel frequency generator 330 is generated so that bands among a plurality of channels are overlapped with each other, in order to improve an impulse response when the radar signal is reflected and received.

Figure 6A:
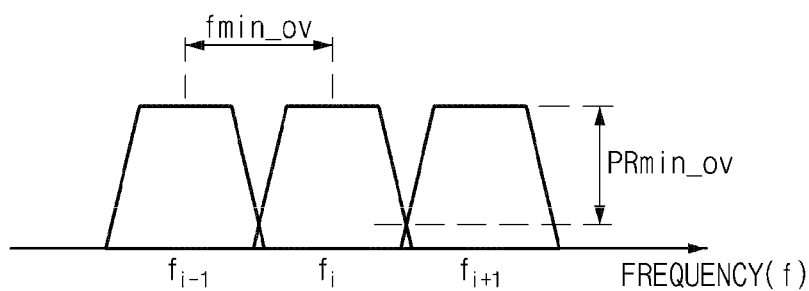
FIGS. 6A and 6B are diagrams for describing a method for setting a channel frequency according to an embodiment of the present invention.
Figure 6B:
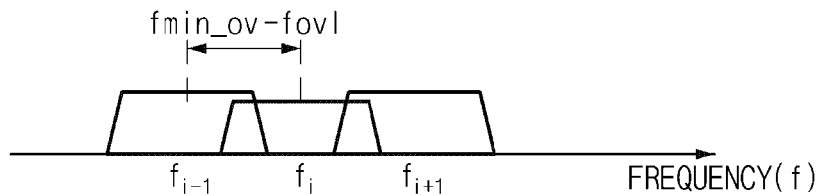

FIGS. 6A and 6B are diagrams for describing a method for setting a channel frequency according to an embodiment of the present invention.

Referring to FIG. 6A, adjacent channel frequencies fi−1, fi, and fi+1 are minimally overlapped with each other. In FIG. 6A, 'PRmin_ov' represents 'a ratio of a division band signal and an adjacent division band signal' in which division band signals of adjacent channels are minimally overlapped with each other and may be a predetermined value. For example, PRmin_ov may be defined by a user in advance.

An interval between the adjacent channel frequencies that satisfies PRmin_ov may be represented as the minimum overlapping frequency fmin_ov. That is, when the channel frequencies fi−1 and fi for the division band signals of the adjacent channels have a difference larger than the minimum overlapping frequency fmin_ov, both division band signals are not overlapped with each other.

In FIG. 6B, the overlapping frequency fovl may be preset. The overlapping frequency fovl represents a frequency value regarding a degree in which the division band signals of the adjacent channels intend to be overlapped with each other and may be defined by the user in advance. As the minimum overlapping frequency fmin_ov and the overlapping frequency fovl are determined, the channel frequency fi may be determined as represented in Equation 1.

$$f_i = f_{i-1} + f_{min\_ov} - f_{ovl} (0 \le f_{ovl} < f_{min\_ovl})$$ [Equation 1]

In Equation 1, fi and fi−1 represent i-th and (i−1)-th channel frequencies that are adjacent to each other.

The channel frequency fi generated by the channel frequency controller 330 may be provided to each of the transmitting unit 100 and the receiving unit 200, and baseband signals may be irradiated to the division band penetration signals dp by the transmitting unit 100 through the rising frequency convertor 180 and used to drop the reflection signals dr received by the receiving unit 200 to the baseband.

Figure 7:
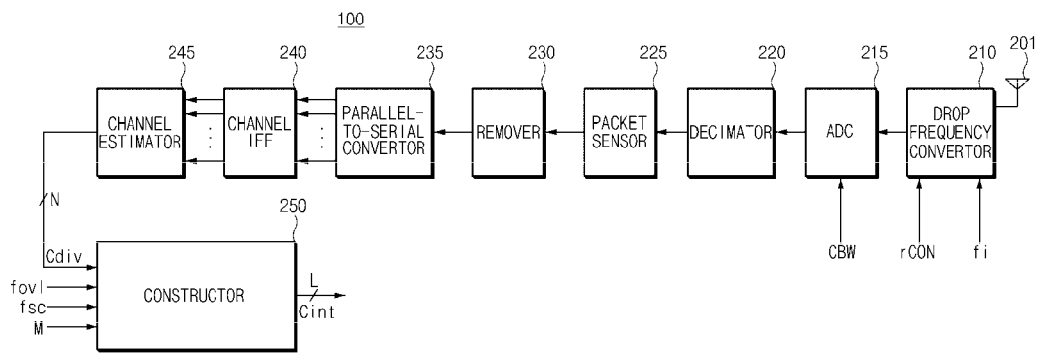
FIG. 7 is a block diagram illustrating an embodiment of a receiving unit of FIG. 1.

FIG. 7 is a block diagram illustrating an embodiment of a receiving unit of FIG. 1.

Referring to FIG. 7, the receiving unit 200 may include a drop frequency convertor 210, an analog-to-digital convertor 215, a decimator 220, a packet sensor 225, a remover 230, a serial-to-parallel convertor 235, a channel FFT 240, a channel estimator 245, and a constructor 250.

The drop frequency convertor 210 drops the reflection signal dr received through the receiving antenna 201 to the baseband. That is, signals in the respective channels are transferred from the pass band to the baseband by the drop frequency convertor 210 as illustrated in FIG. 2B.

The analog-to-digital convertor 215 converts an analog baseband signal into a digital signal. The analog-to-digital convertor 215 may determine a sampling frequency according to a bandwidth of an input channel and perform digital conversion based on the determined sampling frequency.

The decimator 220 may undersample a signal oversampled by the interpolator 160 of the transmitting unit 100.

The packet sensor 225 may detect a training frame by sensing a preamble signal from an output signal of the decimator 220.

The remover 230 may remove the cyclic prefix code inserted by the transmitting unit 100.

The serial-to-parallel convertor 235 parallelizes outputs of the remover 230 as many as the number of N subcarriers.

The channel FFT 240 may transform signals in a time domain in which the cyclic prefix code is removed and parallelized into the frequency domain.

The channel estimator 245 may generate a frequency domain response signal of the baseband channel signal by estimating the channel.

Figure 8:
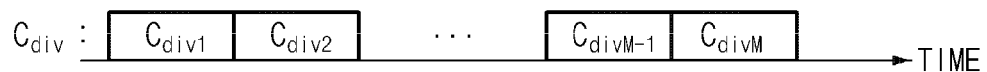
FIG. 8 is a conceptual diagram for describing a configuration of a channel and a subcarrier of a signal received by a constructor included in the receiving unit.

As a result, the signal received by the constructor 250 may be represented as illustrated in FIG. 8. FIG. 8 is a conceptual diagram for describing a configuration of a channel and a subcarrier of a signal received by a constructor included in the receiving unit.

Referring to FIG. 8, division band channel signals Cdiv of M channels are received and N subcarriers may be included in each channel.

A plurality of division band channel signals Cdiv1, Cdiv2, . . . , CdivM−1, and CdivM are generated with the passage of time, and N subcarriers included in each division band channel signal may be represented as $C_{divi}=[C_{divi}(1), C_{divi}(2), \ldots, C_{divi}(N)]$.

As illustrated in FIG. 2C, the constructor 250 performs channel boundary processing, discontinuous phase processing, and division band DC processing before the plurality of division band channel signals Cdiv is converted into the integration band.

According to the embodiment, the orders of the channel boundary processing, the discontinuous phase processing, and the division band DC processing may be changed. However, the discontinuous phase processing needs to be performed after the channel boundary processing is performed.

Figure 9A:
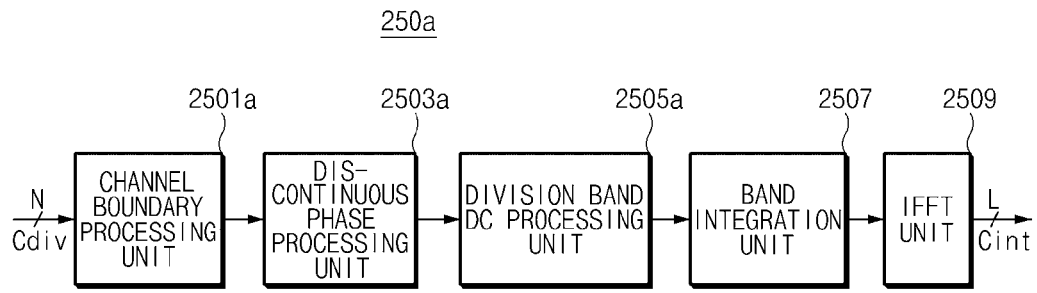
FIGS. 9A to 9C are block diagrams of a constructor according to embodiments of the present invention.
Figure 9B:
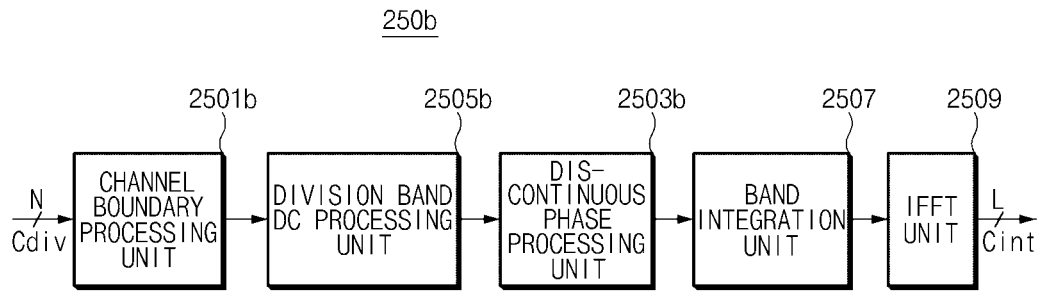
Figure 9C:
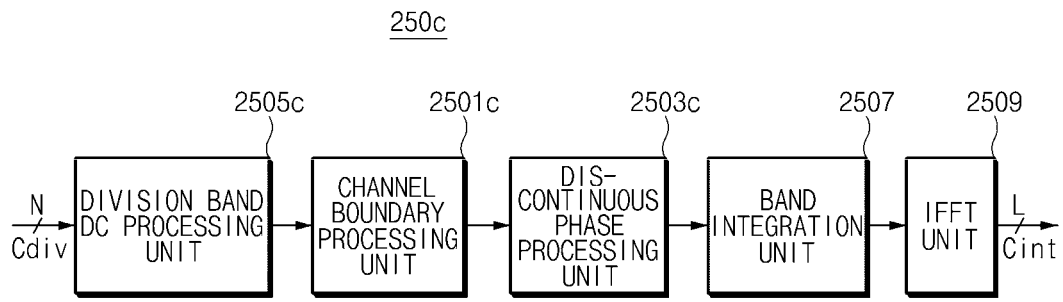

Accordingly, the constructor 250 may have three different configurations so that the division band channel signals Cdiv including N subcarriers are received to output an integration band signal including L subcarriers of an IFFT unit 2509, as illustrated in FIGS. 9A to 9C.

In FIGS. 9A to 9C, channel boundary processing units 2501a, 2501b, and 2501c remove overlapped components of the division band channel signals, which are received through a plurality of channels, on channel boundaries and discontinuous phase processing units 2503a, 2503b, and 2503c process phases to be continued by sensing phase discontinuity of the channel boundary. Further, division band DC processing units 2505a, 2505b, and 2505c reduce a noise component in a DC area when a plurality of reflection signals is converted into the baseband is removed to be integrated into a response signal.

A band integration unit 2507 junctions a signal, of which the channel boundary processing, the discontinuous phase processing, and the division band DC processing are completed, to the integration band based on the channel frequency fi (see FIG. 2C).

The IFFT unit 2509 performs inverse Fourier transform for the band-integrated signal to provide a final integration band impulse response signal.

As the constructor 250 is combined as illustrated in FIGS. 9A to 9C, actual input/output signals of the channel boundary processing units 2501a, 2501b, and 2501c, the discontinuous phase processing units 2503a, 2503b, and 2503c, and the division band DC processing units 2505a, 2505b, and 2505c may be different from each other. Therefore, hereinafter, respective operations of the channel boundary processing, the discontinuous phase processing, and the division band DC processing will be independently described and an operation of signal processing will be described in terms of an input signal I and an output signal O.

In FIGS. 9A to 9C, the respective units are represented by different reference numerals according to the order of the components, but the respective units are integrated into the channel boundary processing unit 2501, the discontinuous phase processing unit 2503, and the division band DC processing unit 2505, which will be described.

Figure 10:
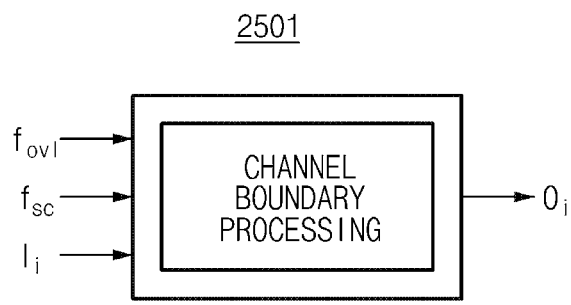
FIG. 10 is a diagram generalizing and illustrating a channel boundary processing unit of the constructor.

FIG. 10 is a diagram generalizing and illustrating a channel boundary processing unit of the constructor.

Referring to FIG. 10, the channel boundary processing unit 2501 receives information regarding overlapping frequency fovl and a subcarrier frequency interval fsc, and an input signal Ii to generate an output signal Oi.

Herein, the input signal Ii as an i-th channel includes N subcarriers.

Accordingly, the input signal Ii of the i channel including N subcarriers may be represented as $I_i=[I_{i1}, I_{i2}, \ldots, I_{iN}]$ and the channel boundary processing may be described by Equation 2 described below.

$$O_i \leftarrow I_i\left(1, \ldots, N - \left\lfloor \frac{f_{ovl}/f_{sc}}{2} \right\rfloor\right), \quad \text{[Equation 2]}$$
$$i = 1$$

$$O_i \leftarrow I_i\left(\left\lfloor \frac{f_{ovl}/f_{sc}}{2} \right\rfloor + 1, \ldots, N - \left\lfloor \frac{f_{ovl}/f_{sc}}{2} \right\rfloor\right),$$
$$1 < i < M$$

$$O_i \leftarrow I_i\left(\left\lfloor \frac{f_{ovl}/f_{sc}}{2} \right\rfloor + 1, \ldots, N\right),$$
$$i = M$$

A first input signal Ii (i=1), that is, a first channel signal is processed as an output signal Oi from a first subcarrier because there is no channel having a smaller frequency than the first channel, that is, channel which is adjacent to the left to the first channel. However, at the right side, a second input signal Ii (i=2) which is adjacent is present. Therefore, a half of the subcarriers $f_{ovl}/f_{sc}$ which are present in an area where the subcarriers are overlapped with the second input signal Ii (i=2) among N original subcarriers are processed in the first input signal Ii (i=1).

Thereafter, from the second input signal Ii (1<i<M), there are channels that are adjacent both left and right by former channels and the subsequent channels. As a result, responses corresponding to a half of frequencies among subcarriers which are present in the overlapping area (see FIG. 3) of the former channels are processed as subcarriers included in the former channel and responses corresponding to the remaining half of frequencies are processed as subcarriers of the latter channels. Therefore, a response in which the frequencies are overlapped is not generated in the channel overlapping area conj, and a channel boundary may be formed between a last subcarrier of the former channel and a first subcarrier of the latter channel.

Lastly, an M-th input signal Ii (i=M) has no channel which is adjacent to the right. Accordingly, up to a last N-th subcarrier is provided as the output signal Oi (i=M), but a first subcarrier corresponds to a subcarrier from a next frequency other than a half of the frequencies of a channel overlapping area processed by an input signal Ii (i=M−1) of a former channel.

An output of the channel boundary processing unit 2501 may be represented as $O_i=[O_{i1}, O_{i2}, \ldots, O_{iend}]$. Herein, the number end of subcarriers of each channel may be represented by Equation 3.

$$end = N - \left\lfloor \frac{\frac{f_{ovl}}{f_{sc}}}{2} \right\rfloor, i = 1, M \quad \text{[Equation 3]}$$

$$end = N - 2 \times \left\lfloor \frac{\frac{f_{ovl}}{f_{sc}}}{2} \right\rfloor, 1 < i < M$$

It can be seen that in the case of the first and last channels (i=1 and M), some subcarriers are removed from only one channel overlapping area, and in the case of channels (1<i<M) other therethan, the subcarriers are removed from both channel overlapping areas.

Figure 11:
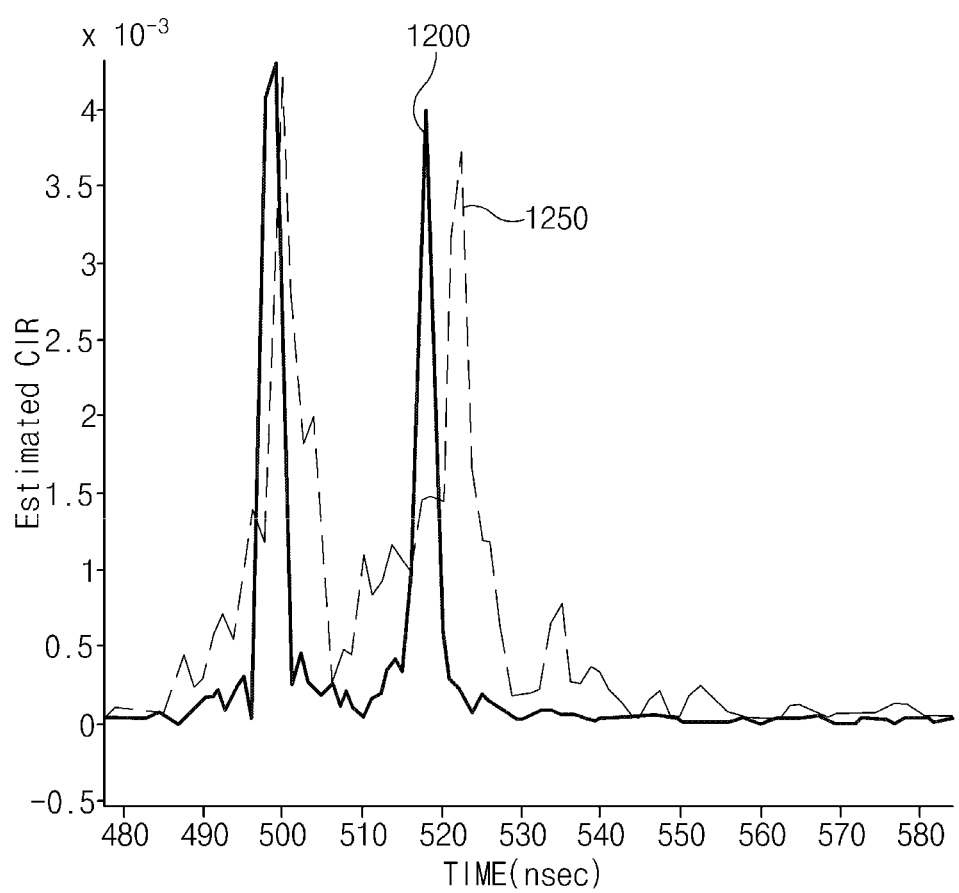
FIG. 11 is a comparison graph of an integration band response signal before and after channel boundary processing.

FIG. 11 is a comparison graph of an integration band response signal before and after channel boundary processing.

A crude distortion occurs in an integration band response signal 1250 before the channel boundary processing (dotted line), but the distortion is decreased in an integration band response signal 1200 after the channel boundary processing (solid line) to easily measure an actual response impulse.

Figure 12:
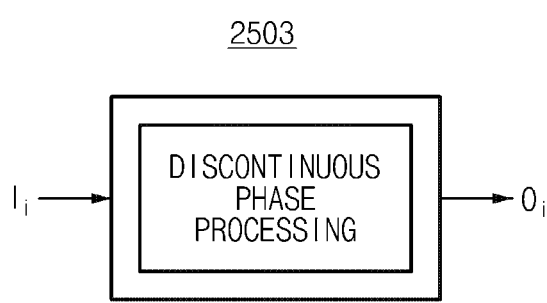
FIG. 12 is a diagram generalizing and illustrating an incomplete phase processing unit of the constructor.

FIG. 12 is a diagram generalizing and illustrating a discontinuous phase processing unit of the constructor.

Since the input and the output of the discontinuous phase processing unit 2503 may be different according to an implementation example of the constructor 250 as described above, hereinafter, the input signal Ii and the output signal Oi will be described.

Even in the discontinuous phase processing unit 2503, the input signal Ii and the output signal Oi may be represented by $I_i=[I_{i1}, I_{i2}, \ldots, I_{iend}]$ and $O_i=[O_{i1}, O_{i2}, \ldots, O_{iend}]$, respectively. The last subcarrier, that is, the number of subcarriers may be represented as in Equation 3 according to the channel number i.

A discontinuous phase processing method of the discontinuous phase processing unit 2503 may be represented by Equation 4.

[Equation 4]

```
for i=1, ..., M
    if i = 1
        O_i ← I_i
    else if i > 1
        ph_Δ ← atan[I_tmp(end)×I_i*(1)]
        O_i ← I_i×(cosph_Δ+jsinph_Δ)
    end
    I_tmp ← I_i
end
```

In Equation 4, a first input signal is just output as the output signal, however, an operation of matching a phase on the channel boundary is processed for coincidence with the phase of the former channel in processing subsequent channels.

For example, the operation follows a scheme which determines a difference $ph\Delta$ between the phase of the last subcarrier of the former channel and the phase of the first subcarrier of the corresponding channel and shifts all output signals of the corresponding channels as long as the determined phase difference.

Phase alignment is performed sequentially from the first channel to the M-th channel and when the phases up to the last channel are aligned, the discontinuous phase processing is completed.

Figure 13A:
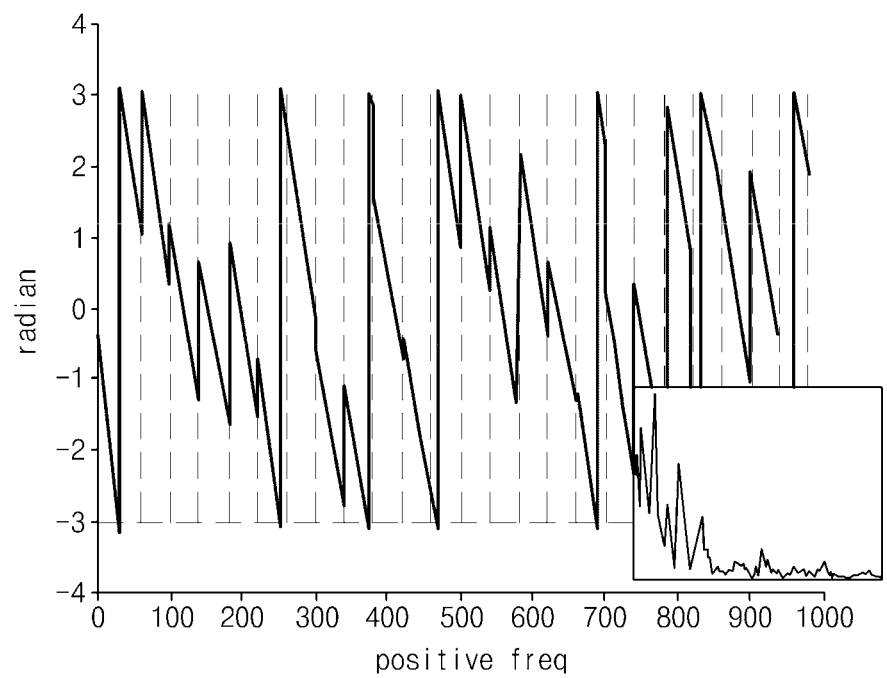
FIGS. 13A and 13B are graphs of comparing an output signal before and after discontinuous phase processing and a resultant impulse response.
Figure 13B:
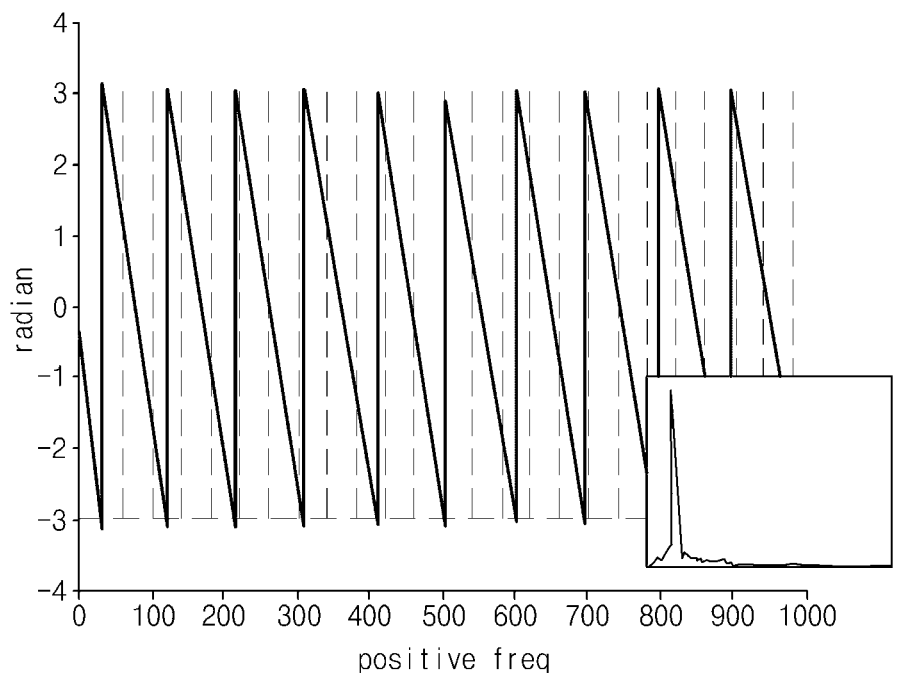

FIGS. 13A and 13B are graphs of comparing an output signal before and after discontinuous phase processing and a resultant impulse response.

Referring to FIG. 13A, phases do not coincide with each other on the channel boundary, which is a part marked with the dotted line and thus has a saw-toothed shape. As a result, it can be seen that an impulse response characteristic illustrated on a lower right end is not good.

Referring to FIG. 13B, it can be seen that the phases coincide with each other in the dotted-line part, and as a result, all of the phases in the dotted line, that is, the channel boundary area coincide with each other. As a result, it can be seen that the impulse response characteristic illustrated on the lower right end is improved.

Figure 14:
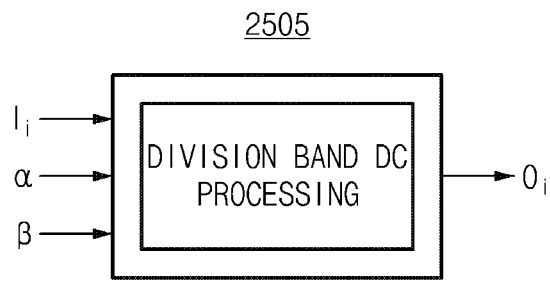
FIG. 14 is a diagram generalizing and illustrating the division band DC processing unit.

FIG. 14 is a diagram generalizing and illustrating the division band DC processing unit. Similarly, an operation of the division band DC processing unit 2505 will also be described in terms of the input signal Ii and the output signal Oi.

The division band DC processing unit 2505 according to the embodiment of the present invention receives the input signal Ii, a negative frequency area a based on DC, and a positive frequency area β based on the DC to generate the output signal Oi.

A division band DC processing method may be described by Equation 5.

$$[O_i(1) \ldots O_i(-\alpha+end/2)] \leftarrow [I_i(1) \ldots (-\alpha+end/2)]$$

$$[O_i(\beta+end/2+2) \ldots O_i(end)] \leftarrow [I_i(\beta+end/2+2) \ldots I_i(end)]$$

$$[O_i(-\alpha+end/2+1) \ldots O_i(\beta+end/2+1)] \leftarrow \text{interpolation}(O_i) \quad \text{[Equation 5]}$$

Referring to Equation 5, each of the input signal Ii and the output signal Oi is constituted by end subcarriers. A DC area is defined as a toward a left side, that is, a negative area around the DC and as β toward a right side, that is, a positive area.

When the channel signals received through the pass band in the receiving unit 200 are dropped to the baseband, the noise may be generated in the DC area, and when the DC area is configured into the integration band without removing the noise in the DC area, the noise is just transferred, and as a result, it is difficult to expect an accurate impulse response.

Accordingly, the division band DC processing unit 2505 just provides input signals of the first subcarrier to a (−α+end/2)-th subcarrier positioned in the negative frequency area around the DC as the output signal.

Thereafter, a (−α+end/2+1)-th subcarrier to a (β+end/2+1)-th subcarrier as subcarriers in the DC area are provided as values acquired by interpolating the output signal Oi of the corresponding channel.

The subsequent subcarriers as subcarriers in a frequency area which is not included in the DC area, that is, a (β+end/2+2)-th subcarrier to the last subcarrier just provide input signals as output signals.

In Equation 5, the number of subcarriers of the input signal Ii and the output signal Oi, that is, the end value may be different depending on the position of the division band DC processing unit 2505 in the constructor 250 illustrated in FIGS. 9A to 9C.

As illustrated in FIGS. 9A and 9B, when the division band DC processing units 2505a and 2505b operate after the channel boundary processing is completed by the channel boundary processing units 2501a and 2501b, the end may be represented as represented in Equation 3.

When the division band DC processing unit 2505c immediately receives the division band channel signal Cdiv including all N subcarriers as illustrated in FIG. 9C, end=N in all channels.

Figure 15A:
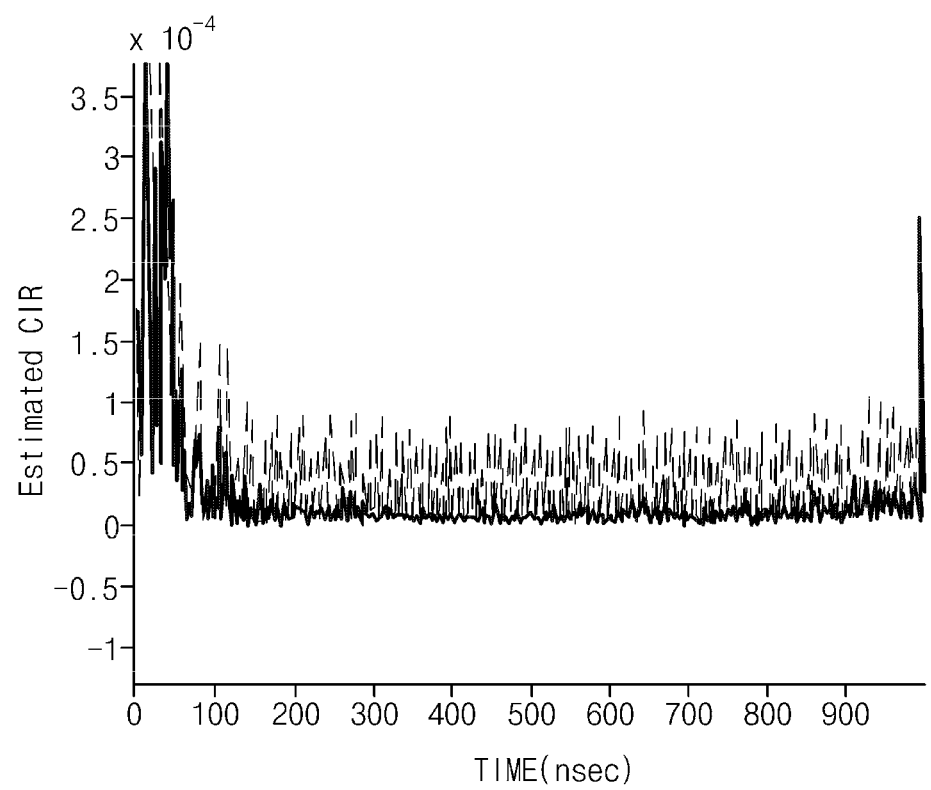
FIGS. 15A and 15B are graphs illustrating a channel impulse response before and after division band DC processing.
Figure 15B:
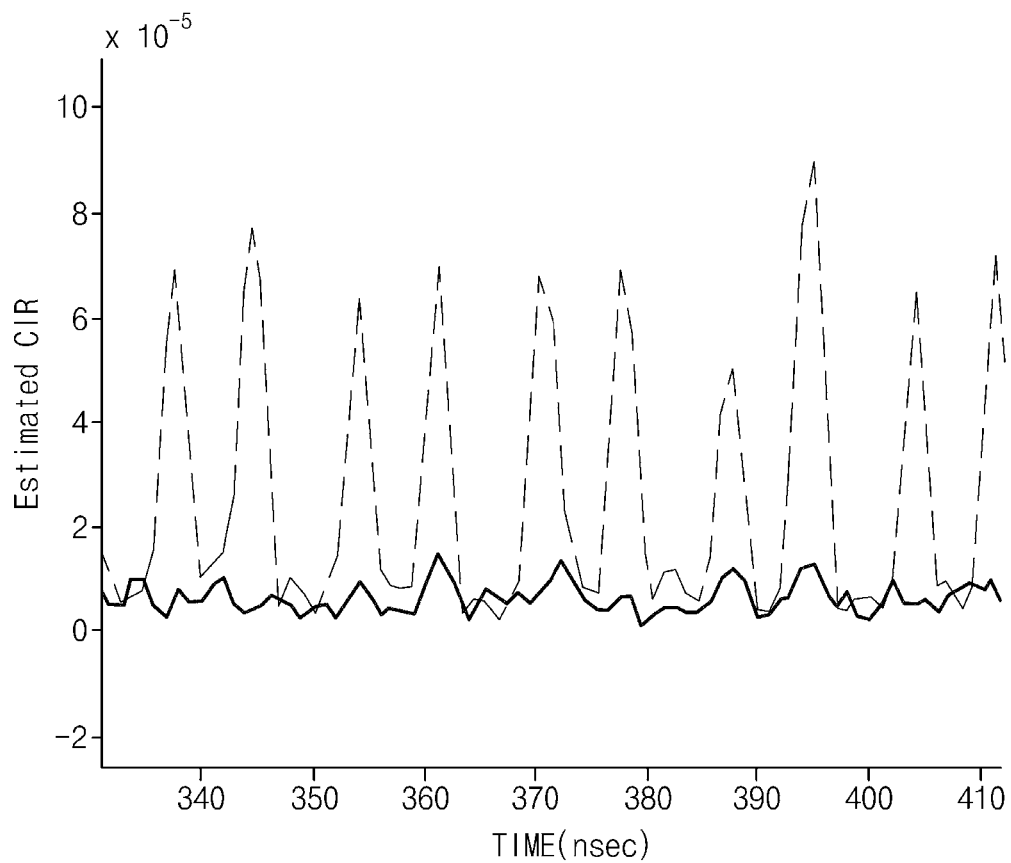

FIGS. 15A and 15B are graphs illustrating a channel impulse response before and after division band DC processing.

As illustrated in FIG. 15A, it can be seen that when the DC area component is removed for each channel, a pulse array distortion does not occur. FIG. 15b is a diagram acquired by enlarging a part of FIG. 15A, and it can be seen that when comparing a case (solid line) in which the DC area component for each channel is removed with a case (dotted line) in which the DC area component for each channel is not removed, the pulse array distortion is remarkably reduced.

Figure 16:
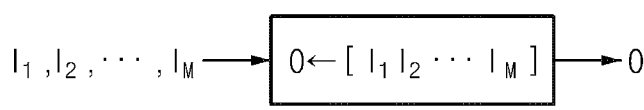
FIG. 16 is a diagram for describing an operation of a band integration unit of the constructor.

FIG. 16 is a diagram for describing an operation of a band integration unit 2507 of the constructor 250 illustrated in FIGS. 9A to 9C.

As described above, the channel boundary of the signals received through the plurality of channels is processed and the phases are continuously adjusted and thereafter, the DC component is removed to generate one output through the integration band. That is, as illustrated in FIG. 2C, the band integration unit 2507 aligns baseband signals of M channels by the channel frequency to output the last response signal.

Figure 17:
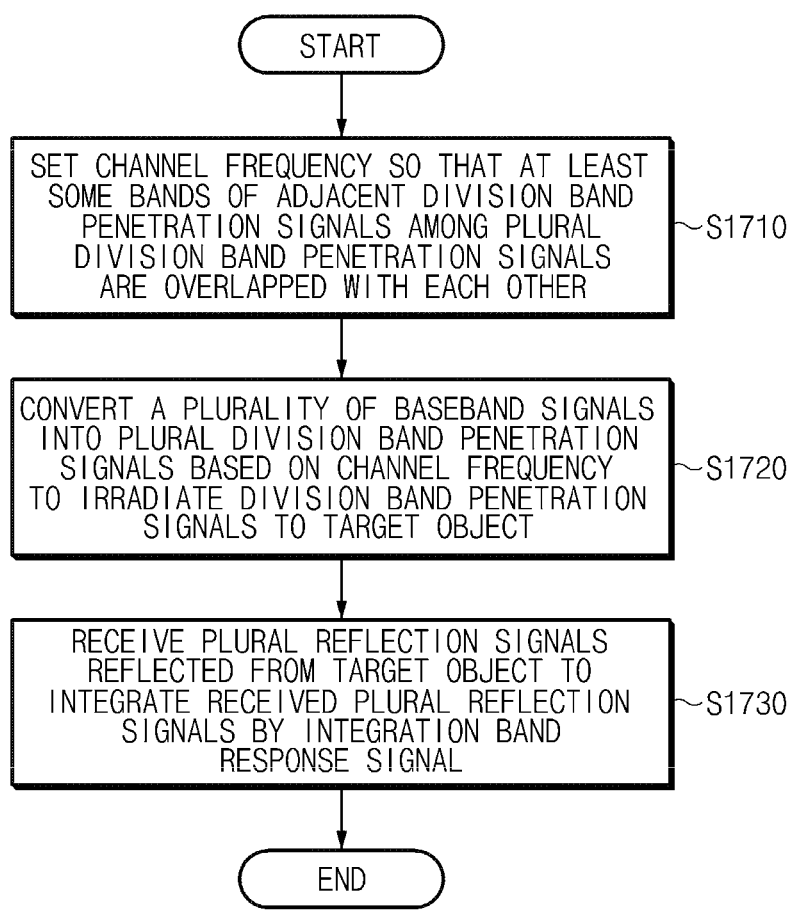
FIG. 17 is a flowchart for describing a method for processing a radar signal according to an embodiment of the present invention.

FIG. 17 is a flowchart for describing a method for processing a radar signal according to an embodiment of the present invention.

Referring to FIG. 17, a control unit 300 of an apparatus 10 for processing a radar signal sets a channel frequency fi so that at least some bands of adjacent division band penetration signals among a plurality of division band penetration signals are overlapped with each other (step S1710). The channel frequency fi may be set as represented in Equation 1 based on a minimum overlapping frequency fmin_ov and a desired overlapping frequency fovl to overlap the division band penetration signals of the adjacent channel with each other.

A transmitting unit 100 converts a plurality of baseband signals into a plurality of division band penetration signals dp based on the channel frequency fi to irradiate the division band penetration signals dp to a target object (step S1720).

The plurality of baseband signals may be raised to the channel frequency fi to be transmitted through a pass band.

A receiving unit 200 receives a plurality of reflection signals dr reflected from the target object to integrate the reflection signals as an integration band response signal (step S1730).

The receiving unit 200 drops the reflection signals to a baseband based on the channel frequency fi.

A channel boundary processing unit 2501 of a constructor 250 may perform channel boundary processing by removing subcarrier components in a band in which dropped baseband reflection signals are expected to be overlapped with each other when the dropped baseband reflection signals are integrated as an integration band response signal.

Herein, the number of subcarriers in the band in which the dropped baseband reflection signals are to be overlapped with each other may be determined as a value $f_{ovl}/f_{sc}$ acquired by dividing an adjacent band overlapping frequency value by a subcarrier frequency. Therefore, in a reflection signal of adjacent channels, subcarriers for a half frequency area are processed in the former channel by dividing $f_{ovl}/f_{sc}$ into a half and subcarriers for the remaining half of frequency area are processed in the directly subsequent channel.

A discontinuous phase processing unit 2503 of the constructor 250 determines a difference in phase on the channel boundary of a plurality of reflection signals to align a phase for each channel.

A division band DC processing unit 2505 of the constructor 250 sets frequencies of α to β as a DC area based on DC to make subcarriers in a frequency area except for the DC area pass as they are.

Values of the subcarriers in the frequency area other than the DC area are all interpolated to correspond to the subcarriers positioned in the DC area. As a result, all noise components of the DC area may be removed.

Lastly, a band integration unit 2507 of the constructor 250 junctions reflection signals of each channel, of which channel boundary processing, discontinuous phase processing, and removal of the DC area are all performed, to an integration band to generate a wideband response signal.

As described above, in the apparatus and the method for processing a radar signal according to the embodiments of the present invention, the division band penetration signal is irradiated to the target object through the plurality of channels for a wideband frequency response, however, the channel frequency is set so that some of the division band penetration signals of each channel are overlapped with each other in order to improve an impulse response.

In receiving the area where some are overlapped with each other, the subcarrier in the overlapping area is removed, the phases are aligned, and the DC area component is removed to acquire an improved impulse response in spite of the band division.

The aforementioned present invention is not limited to the aforementioned embodiments and the accompanying drawings, and it will be obvious to those skilled in the art to which the present invention pertains that various substitutions, modifications, and changes may be made without departing from the technical spirit of the present invention.

What is claimed is:

1. An apparatus for processing a radar signal, comprising:
   a transmitting unit configured to irradiate a plurality of division band penetration signals to a target object based on a channel frequency;
   a receiving unit configured to receive a plurality of division band reflection signals reflected from the target object and to integrate the received division band reflection signals as an integration band response signal; and
   a control unit configured to set the channel frequency so that at least some bands of adjacent division band penetration signals among the plurality of division band penetration signals are overlapped with each other.

2. The apparatus of claim 1, wherein the control unit sets the channel frequency based on a minimum overlapping frequency value for overlapping adjacent division bands and an overlapping area frequency value with a desired adjacent division band.

3. The apparatus of claim 1, wherein the receiving unit includes a drop frequency convertor configured to provide a plurality of baseband reflection signals by dropping the plurality of division band reflection signals to a baseband based on the channel frequency.

4. The apparatus of claim 3, wherein the receiving unit includes a constructor configured to perform channel boundary processing by removing a component of a band to be overlapped when the plurality of division band reflection signals are integrated as the integration band response signal, makes phases on a channel boundary coincide with each other, removes a direct current (DC) component of the baseband, and configures the integration band response signal.

5. The apparatus of claim 4, wherein the constructor includes:
   a channel boundary processing unit configured to remove some components of the plurality of baseband reflection signals based on an overlapping frequency value of an adjacent division band relative to the baseband reflection signals having division bands corresponding thereto;

a discontinuous phase processing unit configured to make coincidence with phases of the baseband reflection signal positioned in the corresponding division band based on a phase of the baseband reflection signal positioned in the adjacent division band; and a division band DC processing unit configured to remove the DC component of the plurality of baseband reflection signals by interpolating signals in a predetermined area around DC.

6. The apparatus of claim 5, wherein the constructor further includes a band integration unit configured to integrate the baseband reflection signals as the integration band response signal based on the channel frequency.

7. The apparatus of claim 5, wherein the channel boundary processing unit removes at least some of the subcarriers included in a frequency of the adjacent division band among subcarriers included in the baseband reflection signal.

8. The apparatus of claim 7, wherein the channel boundary processing unit provides an output signal $O_i=[O_{i1}, O_{i2}, \ldots, O_{iend}]$ constituted by end subcarriers relative to an input signal $I_i=[I_{i1}, I_{i2}, \ldots, I_{iN}]$ of a channel i constituted by N subcarriers:

$$O_i \leftarrow I_i\left(1, \ldots, N - \left\lfloor \frac{f_{ovl}/f_{sc}}{2} \right\rfloor\right),$$
$$i = 1$$

$$O_i \leftarrow I_i\left(\left\lfloor \frac{f_{ovl}/f_{sc}}{2} \right\rfloor + 1, \ldots, N - \left\lfloor \frac{f_{ovl}/f_{sc}}{2} \right\rfloor\right),$$
$$1 < i < M$$

$$O_i \leftarrow I_i\left(\left\lfloor \frac{f_{ovl}/f_{sc}}{2} \right\rfloor + 1, \ldots, N\right),$$
$$i = M$$

$$end = N - \left\lfloor \frac{\frac{f_{ovl}}{f_{sc}}}{2} \right\rfloor, i = 1, M$$

$$end = N - 2 \times \left\lfloor \frac{\frac{f_{ovl}}{f_{sc}}}{2} \right\rfloor, 1 < i < M,$$

where N represents the number of subcarriers per channel, M represents the number of channels, $f_{ovl}$ represents an overlapping area frequency value with the desired adjacent division band, and fsc represents a subcarrier frequency interval.

9. The apparatus of claim 5, wherein the discontinuous phase processing unit provides an output signal $O_i=[O_{i1}, O_{i2}, \ldots, O_{iend}]$ constituted by end subcarriers relative to the input signal $I_i=[I_{i1}, I_{i2}, \ldots, I_{iend}]$ of the channel i constituted by end subcarriers, and performs an operation to make the phases coincide with each other according to algorithm processing of:

$$end = N - \left\lfloor \frac{\frac{f_{ovl}}{f_{sc}}}{2} \right\rfloor, i = 1, M$$

$$end = N - 2 \times \left\lfloor \frac{\frac{f_{ovl}}{f_{sc}}}{2} \right\rfloor, 1 < i < M$$

wherein N represents the number of subcarriers per channel, M represents the number of channels, fovl represents an overlapping area frequency value with the desired adjacent division band, and fsc represents a subcarrier frequency interval, and

```
for i=1, ..., M
    if i = 1
        O_i ← I_i
    else if i > 1
        ph_Δ ← atan[I_tmp(end)×I_i*(1)]
        O_i ← I_i×(cosph_Δ+jsinph_Δ)
    end
    I_tmp ← I_i
end
``` wherein phΔ represents a difference between a phase of a last subcarrier of a former channel and a phase of a first subcarrier of a corresponding channel, and $I_{tmp}(end)$ represents an input signal of a last subcarrier of the former channel.

10. A method for processing a radar signal, comprising:
setting a channel frequency so that at least some bands of adjacent division band penetration signals among the plurality of division band penetration signals are overlapped with each other;
irradiating the plurality of division band penetration signals to a target object by converting a plurality of baseband signals into the plurality of division band penetration signals based on the channel frequency; and
receiving a plurality of division band reflection signals reflected from the target object and generating an integration band response signal by integrating the received division band reflection signals.

11. The method of claim 10, wherein the setting of the channel frequency includes setting the channel frequency based on a minimum overlapping frequency value for overlapping adjacent division bands and an overlapping area frequency value with a desired adjacent division band.

12. The method of claim 10, wherein generating the integration band response signal includes performing channel boundary processing by removing a component of a band to be overlapped when the reflection signals are integrated by the integration band response signal.

13. The method of claim 12, wherein the number of subcarriers of the band to be overlapped among a plurality of carriers included in the respective division band reflection signals is determined based on a ratio of an adjacent band overlapping frequency value and a subcarrier frequency.

14. The method of claim 13, further comprising:
removing half of the subcarriers of the band to be overlapped from each of the division band reflection signals.

15. The method of claim 10, wherein generating the integration band response signal includes making coincidence of a phase with an adjacent reflection signal.

16. The method of claim 10, wherein generating the integration band response signal includes dropping the plurality of reflection signals to a baseband based on the channel frequency.

17. The method of claim 16, further comprising:
removing a DC component from the dropped baseband reflection signals.

18. The method of claim 17, wherein the removing of the DC component includes interpolating the subcarriers of the baseband reflection signals in a frequency area other than a predetermined frequency area to make the interpolated subcarriers correspond to values of subcarriers positioned in the predetermined frequency area.

19. The method of claim 18, wherein the DC area includes a negative frequency area α and a positive frequency area β around DC, and making of the interpolated subcarriers correspond to values of subcarriers positioned in the predetermined frequency area is represented by [$O_i(-\alpha+\text{end}/2+1)$ ... $O_i(\beta+\text{end}/2+1)$]←interpolation($O_i$), and $$\text{end} = N - \left\lfloor \frac{\frac{f_{ovl}}{f_{sc}}}{2} \right\rfloor, i = 1, M$$

$$\text{end} = N - 2 \times \left\lfloor \frac{\frac{f_{ovl}}{f_{sc}}}{2} \right\rfloor, 1 < i < M$$

wherein $O_i$ represents an ith output signal, interpolation (Oi) represents an interpolation of the ith output signal, N represents the number of subcarriers per channel, M represents the number of channels, fovl represents an overlapping area frequency value with the desired adjacent division band, and fsc represents a subcarrier frequency interval.

20. The method of claim 10, wherein generating the integration band response signal includes integrating the baseband reflection signals based on the channel frequency.

\* \* \* \* \*